United States Patent
Luciotti et al.

(10) Patent No.: US 9,976,671 B2
(45) Date of Patent: May 22, 2018

(54) VALVE

(71) Applicant: F.I.P. Formatura Iniezione Polimeri S.p.A., Casella, Genoa (IT)

(72) Inventors: Lucio Luciotti, Casella (IT); Corrado Mazzacano, Casella (IT)

(73) Assignee: F.I.P. Formatura Iniezione Polimeri S.p.A., Casella (IT)

( * ) Notice: Subject to any disclaimer, the term of this patent is extended or adjusted under 35 U.S.C. 154(b) by 78 days.

(21) Appl. No.: 15/146,506

(22) Filed: May 4, 2016

(65) Prior Publication Data
US 2016/0327179 A1 Nov. 10, 2016

(30) Foreign Application Priority Data
May 6, 2015 (EP) .................................. 15166495

(51) Int. Cl.
*F16K 35/02* (2006.01)
*G05G 1/08* (2006.01)
*F16K 7/12* (2006.01)

(52) U.S. Cl.
CPC ............ *F16K 35/027* (2013.01); *F16K 7/126* (2013.01); *G05G 1/082* (2013.01); *Y10T 74/2084* (2015.01)

(58) Field of Classification Search
CPC .... F16K 35/027; G05G 1/082; Y10T 74/2084
See application file for complete search history.

(56) References Cited

U.S. PATENT DOCUMENTS 3,193,243 A * 7/1965 Billington ............. F16K 31/047
251/96
3,707,204 A * 12/1972 Dussardier .............. F16K 31/60
184/55.2
4,779,305 A * 10/1988 Gorsek ................... G05G 1/082
16/441
5,037,066 A 8/1991 Kerger et al.
5,490,660 A * 2/1996 Kamezawa ........... F16K 35/027
251/96
5,513,831 A * 5/1996 Seward ................. F16K 35/027
192/95
8,104,742 B2 * 1/2012 Ishihara .................. F16K 31/50
251/265
2011/0198529 A1 8/2011 Bugatti

FOREIGN PATENT DOCUMENTS

DE   10 2009 025 441 A1   1/2011
FR         2 651 297 A1   3/1991
WO        WO 00/22327     4/2000

* cited by examiner

*Primary Examiner* — Kevin Murphy
(74) *Attorney, Agent, or Firm* — Blank Rome LLP

(57) ABSTRACT

A valve comprises a housing, a control handle rotatable relative to the housing, a flow control mechanism in the housing and connected with the control handle, stop seats formed on the housing, a locking body in contact with the control handle, stopping portions formed in the locking body and movable between a locking position in which the stopping portions engage the stop seats and a release position in which the stopping portions are moved away from the stop seats, a control surface formed in the handle. The handle is movable between a lowered position towards the housing and a position raised from the housing. In the raised position, the control surface pushes the stopping portions in the locking position and, in the lowered position, the control surface allows the stopping portions to return in the release position.

14 Claims, 5 Drawing Sheets

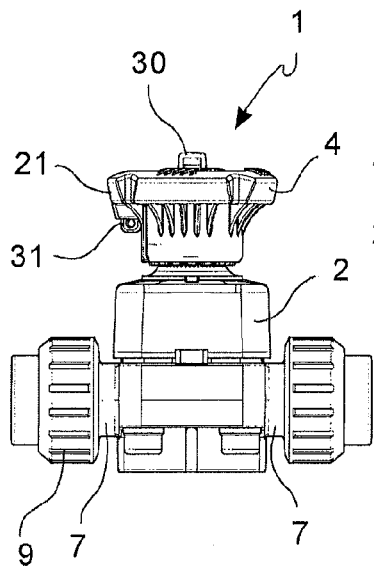
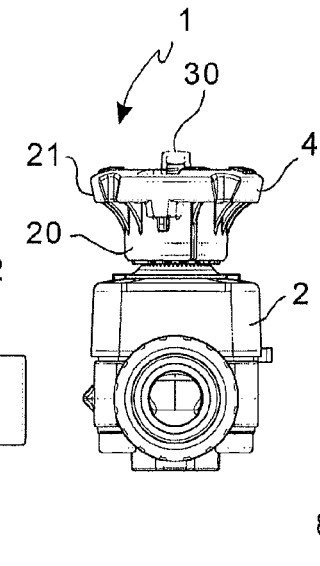
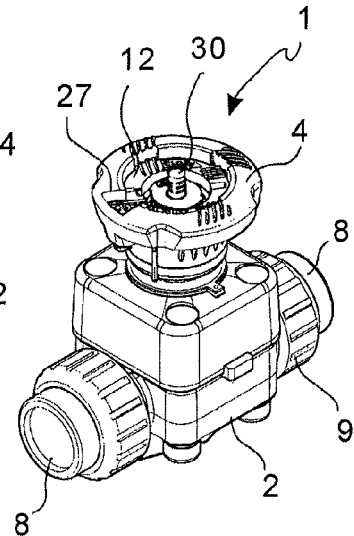
FIG. 2    FIG. 3    FIG. 4
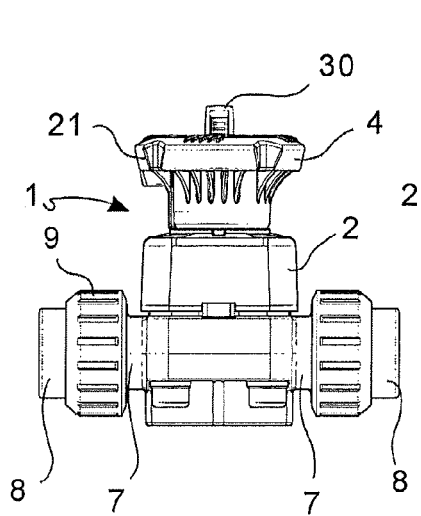
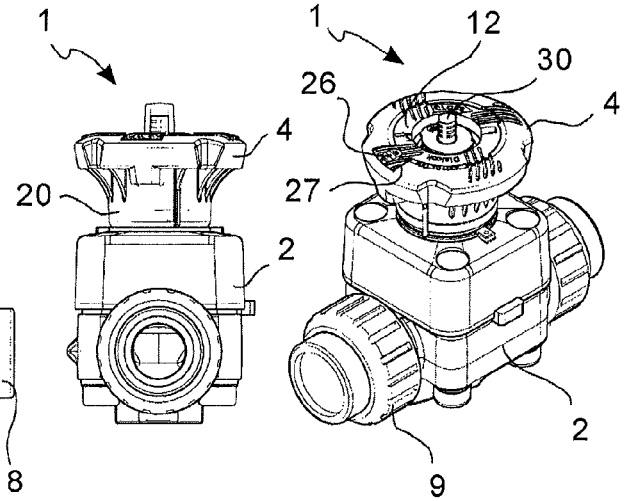
FIG. 5    FIG. 6    FIG. 7

VALVE

BACKGROUND OF THE INVENTION

1. Field of the Invention

This invention relates in general to a device for conveying and/or distributing fluids with a control handle and, in particular, to a hydraulic valve with a lockable and unlockable control handle.

2. Description of the Related Art

There are known valves with a valve body with one or more tubular connection portions connectable with pipes of a system for conveying and/or distributing fluids, a control handle, an obturator received in the valve body and connected with the control handle by means of a transmission shaft, and with locking means for locking the handle in certain operating positions of the valve.

The locking means of the prior art include, for example, locking levers and padlocks whose actuation is tedious and costly in terms of time. The locking levers of the prior art are subject to easy breakage of the portions that engage to achieve the lock. Furthermore, the locking systems in the valves of the prior art are not intuitive and tend to block the movement of the handle precisely during its manual operation. This is due to the fact that the user, during the rotation of the handle, applies not only a twisting moment, but also an axial force directed towards the valve body.

SUMMARY OF THE INVENTION

The aim of the present invention is therefore to propose a device for conveying and/or distributing fluids, for example a valve, provided with a housing with at least one fluid connection portion and a control handle, having characteristics such as to obviate the disadvantages of the known art.

A particular aim of the invention is to propose a device for conveying and/or distributing fluids that allows the locking and unlocking of the handle in a more intuitive way compared to the prior art, that reduces the risk of unwanted stoppages of the handle during its actuation and that is less prone to breakage of components that engage one another to lock the handle.

At least a part of the aims are achieved by a device for conveying and/or distributing fluids, in particular a valve, comprising:

- a housing with one or more tubular connection portions,
- a control handle connected to the housing and rotatable relative to the housing about a control axis in a plurality of control positions,
- a plurality of stop seats formed in the housing around the control axis,
- a locking body connected to the housing and in contact with the control handle,
- a plurality of stopping portions formed by one of said locking body and said handle and movable between a locking position in which the stopping portions engage the stop seats and a release position in which the stopping portions are moved away from the stop seats,
- a control surface formed on the other of said locking body and said handle, wherein the control handle is translatable with respect to the housing and with respect to the locking body along the control axis between a position lowered towards the housing and a position raised from the housing, wherein, when the handle is translated to the raised position, the stopping portions and the control handle are integral in rotation around the control axis and the control surface pushes the stopping portions in the locking position and, when the handle is translated to the lowered position, the position of the control surface allows the stopping portions to position themselves in the release position.

In this way, when a user rests his hand on the handle to operate it, it is sufficient to increase the abutment pressure towards the housing already naturally exerted in order to obtain the release of the handle. This allows an intuitive use of the device and obviates the risk of jamming of the handle during its actuation.

BRIEF DESCRIPTION OF THE DRAWINGS

To better understand the invention and appreciate the advantages, several embodiments will be described below by way of non-limiting example, making reference to the figures, in which:

FIGS. 2, 3, 4 are side, front and perspective views of the valve in FIG. 1 with the handle raised and locked, FIGS. 5, 6, 7 are side, front and perspective views of the valve in FIG. 1 with the handle lowered and unlocked.

DETAILED DESCRIPTION OF THE PREFERRED EMBODIMENTS

Figure 1A:
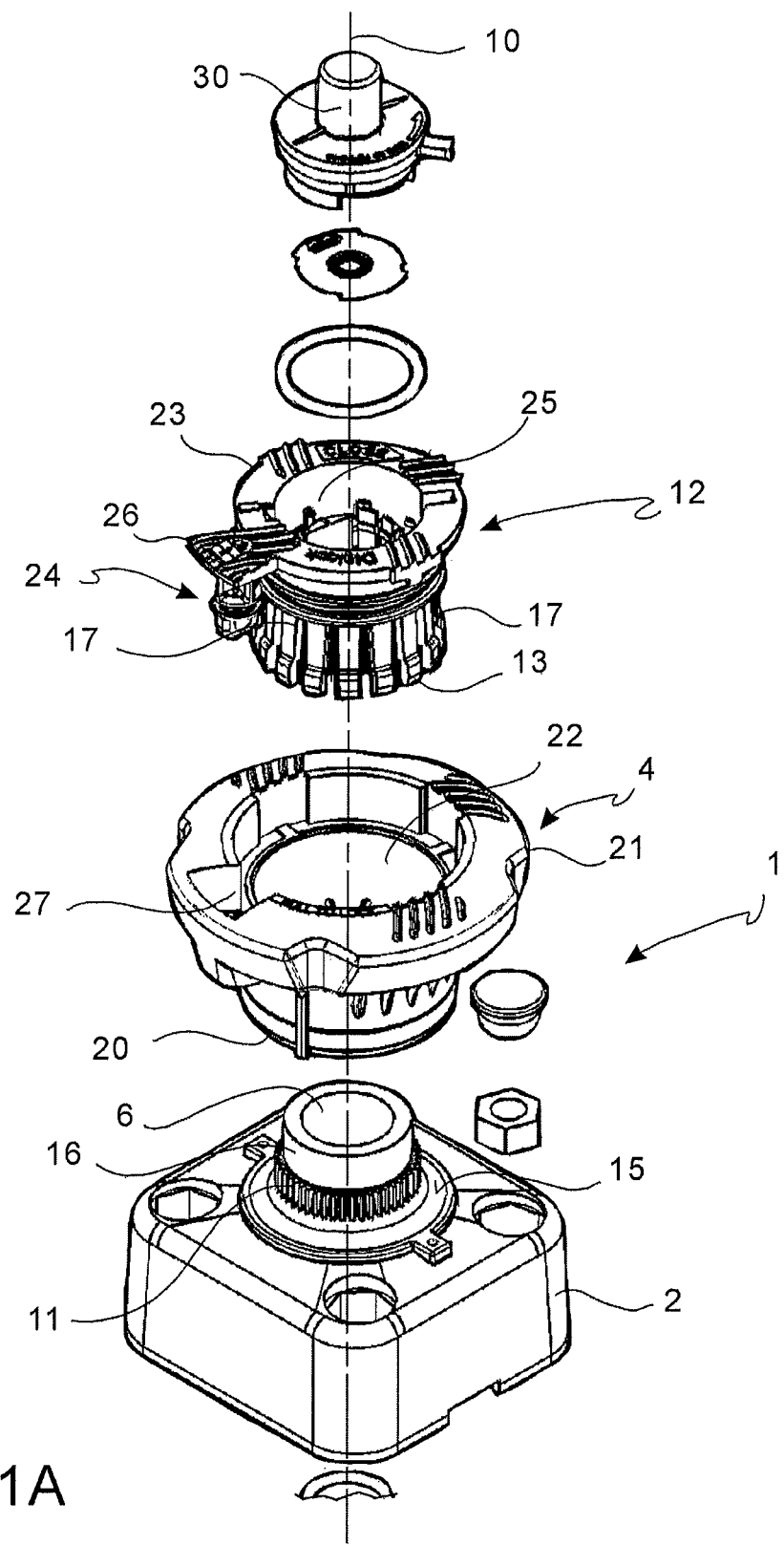
FIG. 1A, 1B is an exploded perspective view of a diaphragm valve with a control handle and locking and release means according to an embodiment of the invention.
Figure 1B:
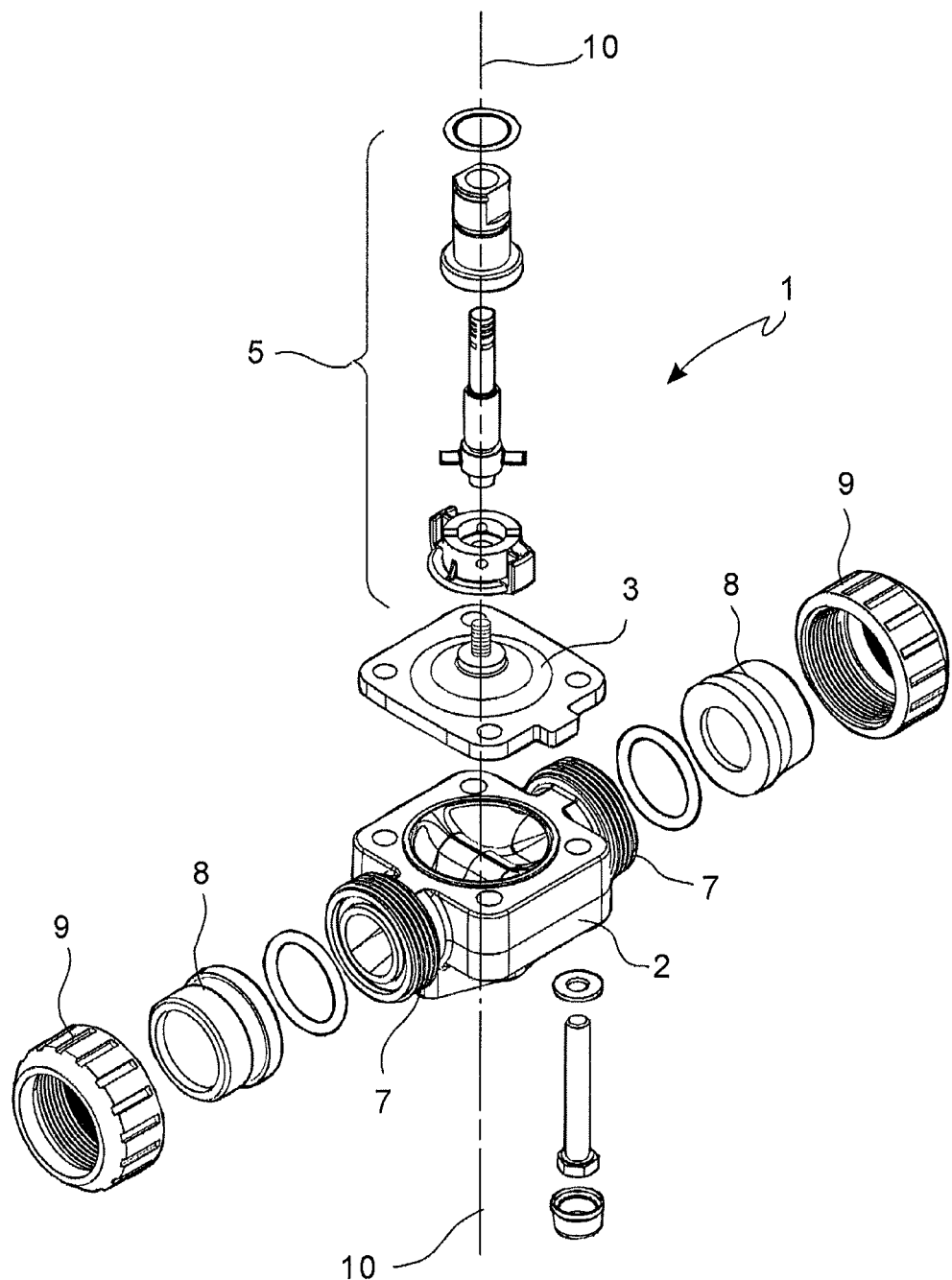

With reference to the figures, a device for conveying and/or distributing fluids, in particular a valve, is indicated as a whole by reference number 1. The device 1 may comprise a valve body or housing 2, a flow control member 3, for example a diaphragm obturator or ball obturator disposed inside the valve body 2, a control handle 4 connected to the housing 2 and adapted to position the flow control member 3 by means of a transmission mechanism 5 arranged in a suitable passage 6 of the housing 2. The transmission mechanism 5 may comprise, for example, a transmission shaft that connects the control handle 4 in a manner to rotate together with a rotatable flow control member 3, for example a ball obturator. Alternatively, the transmission mechanism 5 may comprise a screw jack connected between the control handle 4 and the flow control member 3 and configured to convert a rotary motion of the control handle 4 into a translation motion that moves and/or deforms the flow control member 3, for example a flexible diaphragm (FIG. 1). The transmission mechanism 5 and the flow control member 3 together form a flow control mechanism 3, 5 of the device 1.

The control handle 4 is rotatable with respect to the housing 2 around a geometrical control axis 10 in a plurality of control positions, for example a position of total closure, a position of total opening and intermediate partial opening positions adjustable in a discrete or continuous manner.

The flow control member 3, depending on its operating position, affects (for example adjusts, blocks, divides or distributes) a flow of fluid, for example a liquid that passes through the valve or more generally the device 1.

The housing 2 forms one or more tubular connection portions 7, reversibly connectable with corresponding connection ends 8 of a system for conveying and/or distributing fluids, for example a piping system. The connecting portions 7 of the device 1 and the connection ends 8 of the piping system are connectable to each other by one or more ring nuts 9 coupleable to one and screwable to the other of the connection portions 7 and the connection ends 8.

Figure 8:
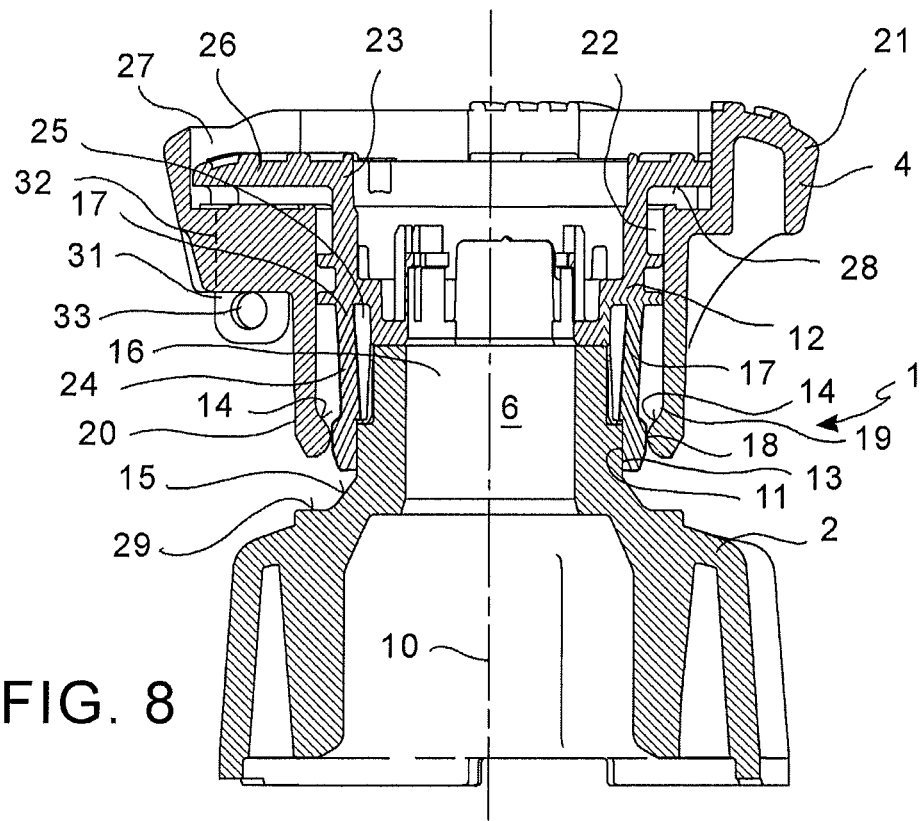
FIG. 8 is a sectional view of a valve with the handle lowered on the housing and unlocked according to an embodiment.

To allow for easy locking and unlocking of the adjustment position of the control handle 4, the device 1 also comprises:
a plurality of stop seats 11 formed on the housing 2 around the control axis 10,
a locking body 12 connected to the housing 2 and in contact with the control handle 4,
a plurality of stopping portions 13 formed by the locking body 12 and movable between a locking position (FIG. 8) in which the stopping portions 13 engage the stop seats 11, and a release position (FIG. 9) in which the stopping portions 13 are moved away from the stop seats 11,
a control surface 14 formed in the control handle 4 and in contact with the stopping portions 13,
wherein the control handle 4 is movable with respect to the housing 2 and with respect to the locking body 12 along the control axis 10 between a position lowered towards the housing 2 (FIGS. 5, 6, 7 and 9) and a position raised from the housing 2 (FIGS. 2, 3, 4 and 8),
wherein, when the handle 4 is moved to the raised position, the stopping portions 13 and the control handle 4 are torque resistingly coupled around the control axis 10 and the control surface 14 pushes the stopping portions 13 in the locking position and, when the handle 4 is moved to the lowered position, the control surface 14 is moved to a position that allows the stopping portions 13 to position themselves in the release position.

In this way, when a user rests his hand on the handle 4 to operate it, it is sufficient to increase the abutment pressure towards the housing 2 already naturally exerted in order to obtain the release of the handle 4. This allows an intuitive use of the device 1 and obviates the risk of jamming of the handle 4 during its actuation.

In an alternative embodiment, the stopping portions 13 can be formed by the control handle 4 and the control surface 14 can be formed by the locking body 12.

In an embodiment, the stop seats 11 comprise a "striped" knurling or annular toothed crown, formed in an outer surface 15 of the housing 2. Preferably, the stop seats 11 are formed in an outer, cylindrical or truncated-conical, surface 15 of a turret 16 (the so-called "bonnet" portion of the valve body) of the housing 2 to which the control handle 4 is connected. This turret 16 is coaxial with the control axis 10 and forms the passage for the transmission mechanism 5.

In the present description, unless otherwise specified, the geometric references "radial", "circumferential" and "axial" are to be understood with reference to the control axis 10.

In an embodiment, the stopping portions 13 are formed in a plurality of elastically flexible beams 17 or tabs that are preferably cantilevered.

The beams 17 and the control surface 14 are preferably positioned and shaped in such a way that, in response to the translational motion of the handle 4 along the control axis 10, the control surface 14 loads the beams 17 in the radial direction to the control axis 10 and, consequently, the beams 17 flex in the radial direction and, in the locking position, the stopping portions 13 are meshing in radial direction with the stop seats 11.

The beams 17 or tabs are preferably oriented in a direction parallel, or approximately parallel, with possible inclination in the range of ±15°, with respect to the control axis 10. This allows a dense and close arrangement of many stopping portions 13 and reduces the local load and the risk of breakage of the stopping portions 13. The stopping portions 13 themselves are directed radially inwardly.

Advantageously, the stopping portions 13 form a toothing or "striped" knurling of complementary shape to the annular toothed crown 11. Preferably, the stopping portions 13 and/or the beams 17 are arranged next to one another at a close distance such as to form, in the locking position, a continuous annular toothing or knurling.

In an embodiment, the control surface 14 forms an annular surface, circumferential to the control axis 10, extended radially outside of the stopping portions 13 and/or of the beams 17, and in contact with them. The annular surface forms a radial narrowing 18 on a side facing towards the housing 2 and an adjacent radial enlargement 19 on a side of the narrowing 18 opposite to the housing 2.

Figure 9:
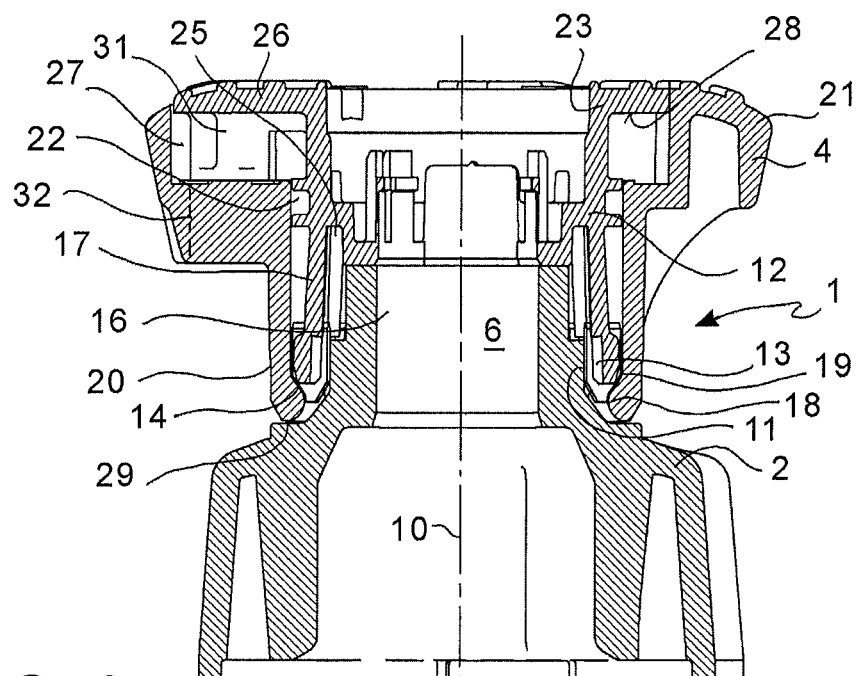
FIG. 9 is a sectional view of a valve with the handle raised from the housing and locked according to an embodiment.

In this way, when the handle 4 translates towards the raised position, the narrowing 18 slides on the stopping portions 13 and/or on the beams 17, pushing them radially inward to the locking position (FIG. 8) and, when the handle 4 translates towards the lowered position, the narrowing 18 moves away from the stopping portions 13 and/or the beams 17 and the enlargement 19 provides space for a (preferably elastic) radially outward return movement of the stopping portions 13 to the release position (FIG. 9).

In this embodiment, the locking is achieved by a shape connection, while the release is obtained and maintained only thanks to the elastic return force of the stopping portions 13 and/or of the beams 17.

In an alternative embodiment, the control surface 14 may comprise a further portion positioned and shaped so as to engage the stopping portions 13 and/or the beams 17 radially from the inside and to radially push them outward when the handle 4 is translated to the lowered position. In this way, the release would also be achieved by a shape connection.

In an embodiment, the control handle 4 is shaped externally as a handwheel.

The control handle 4 has a tubular shape with:
a possibly radially enlarged ("handwheel") or elongated (lever handle) upper portion 21, that serves as a gripping portion,
a lower, for example approximately cylindrical, portion 20 that forms the control surface 14, as well as
a possibly pass-through internal cavity 22 that receives the locking body 12 and, directly or indirectly, at least a part of the turret 16 of the housing 2.

The locking body 12 has a tubular shape with:
a possibly radially widened upper section 23,
a bottom portion 24 that forms the beams or tabs 17 and/or the stopping portions 13, as well as
a possibly pass-through internal seat 25, that accommodates at least a part of the turret 16 and that creates a (torsion-resisting) connection of the locking body 12 with the transmission mechanism 5.

By means of the connection with the transmission mechanism 5 or by means of a direct connection, for example a snap connection, the locking body 12 is fixed (to the turret 16) to the housing 2 in a rotatable manner relative to the housing 2 around the control axis 10, but without the possibility of translating with respect to the housing 2 along the control axis 10. The amplitude of rotation of the locking body 12 relative to the housing 2 is determined and limited by the amplitude of adjustment of the control mechanism 3, 5 of the valve 1.

The locking body 12 is received in the internal cavity 22 of the handle 4, and hence interposed between (the turret 16 of) the housing 2 and the handle 4. The handle 4 and the locking body 12 are locked together in rotation (torque resistingly coupled) around the control axis 10, but the handle 4 can translate axially with respect to the locking body 12.

The torsional connection with translatory axial sliding between the handle 4 and the locking body 12 is embodied by means of one or more radial projections 26 of the upper section 23 that engage corresponding radial recesses 27 of the upper portion or vice versa, wherein the one or more radial recesses 27 are extended in axial direction to form translation guides.

The translation stroke of the handle 4 is delimited by an upper abutment surface 28 formed on the locking body 12 (raised position) and by a lower abutment surface 29 formed on the housing 2 or the locking body 12.

According to an embodiment, the internal seat 25 of the locking body 12 is open towards the outside of the housing 2 and receives an indicator device 30 visible from the outside and connected with the transmission mechanism 5.

According to a further embodiment, the locking body 12 forms a plate 31 extended through a corresponding slot 32 of the handle 4 and having a hole 33 for receiving a padlock that protrudes externally from the handle 4 only when it is in the raised position, allowing a locking with a padlock.

The device 1, in particular the diaphragm valve or ball valve, and all its components can be made, at least partially and preferably completely, of synthetic, for example polymeric, material.

The device 1 for conveying and/or distributing fluids described so far, allows the locking and unlocking of the handle 4 in a more intuitive way compared to the prior art, reduces the risk of unwanted stoppages of the handle 4 during its actuation and is less prone to breakage of components that engage one another to lock the handle.

Figure 10:
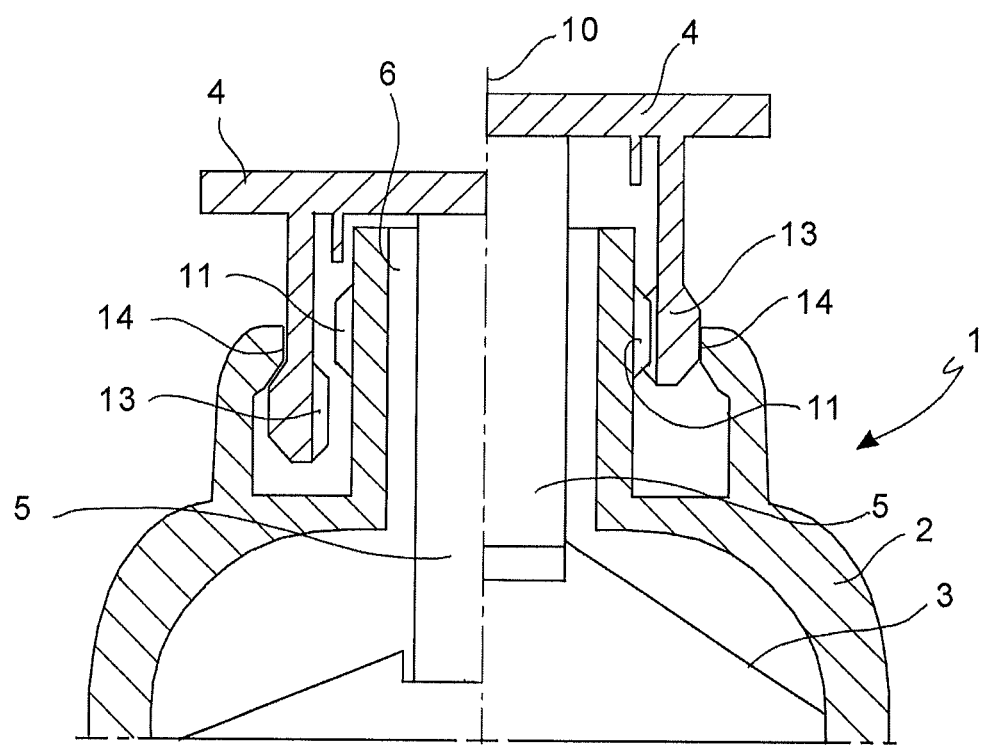
FIG. 10 is a sectional view of a valve with the handle raised from the housing (right side) and locked, as well as with handle lowered and unlocked (left side) according to a further embodiment.

In accordance with a further embodiment (FIG. 10), the inventive idea is also implementable in a valve 1, comprising:
- a housing 2 with one or more tubular connection portions 7,
- a control handle 4 connected to the housing 2 and rotatable relative to the housing 2 about a control axis 10 into a plurality of control positions,
- a flow control mechanism 3, 5 received in housing 2 and connected with the control handle 4,
- a plurality of stop seats 11 formed in the housing 2 around the control axis 10,
- a plurality of stopping portions 13 formed by the handle 4 and movable between a locking position in which the stopping portions 13 engage the stop seats 11 and a release position in which the stopping portions 13 are moved away from the stop seats 11,
- a control surface 14 formed by the housing 2, wherein the handle 4 is translatable with respect to the housing 2 along the control axis 10 between a position lowered towards the housing 2 and a position raised from the housing 2, wherein, when the handle 4 is translated to the raised position, the control surface 14 pushes the stopping portions 13 into the locking position, wherein, when the handle 4 is moved to the lowered position, the control surface 14 is positioned to allow the stopping portions 13 to return to the release position.

In this embodiment, the stopping portions 13, while being formed by the handle 4, can be shaped and positioned as described with reference to FIGS. 1 to 9. Similarly, also the control surface 14 can be shaped in an inverse manner (upside down) with respect to what has been described with reference to FIGS. 1 to 9.

Obviously, a person skilled in the art, in order to satisfy contingent and specific needs, may make further modifications and variations to the device 1 according to this invention, all however contained within the scope of the invention as defined by the following claims.

What is claimed is:

1. A valve, comprising:
   a housing with one or more tubular connection portions,
   a control handle connected to the housing and rotatable relative to the housing about a control axis in a plurality of control positions,
   a flow control mechanism received in the housing and connected with the control handle,
   a plurality of stop seats formed in the housing around the control axis,
   a locking body connected to the housing and in contact with the control handle,
   a plurality of stopping portions formed by one of said locking body and movable between a locking position in which the stopping portions engage the stop seats and a release position in which the stopping portions are moved away from the stop seats,
   a control surface formed on said handle,
   wherein the handle is movable with respect to the housing and with respect to the locking body along the control axis between a position lowered towards the housing and a position raised from the housing,
   wherein, when the handle is moved to the raised position, the control surface pushes the stopping portions in the locking position,
   wherein, when the handle is moved to the lowered position, the control surface is positioned to allow the stopping portions to return to the release position.

2. A valve according to claim 1, wherein the stop seats comprise an annular toothed crown, formed in an outer surface of a turret of the housing.

3. A valve according to claim 2, wherein the stopping portions are formed in a plurality of elastically flexible beams.

4. A valve according to claim 3, wherein the beams and the control surface are positioned and shaped in such a way that,
   in response to the translational motion of the handle along the control axis, the control surface loads the beams in the radial direction to the control axis and the beams flex in the radial direction and, in the locking position, the stopping portions are meshing in radial direction with the stop seats.

5. A valve according to claim 4, wherein the beams are oriented in a parallel direction, with possible inclination in the range of ±15°, with respect to the control axis.

6. A valve according to claim 3, wherein the stopping portions are arranged next to one another at a close distance such as to form, in the locking position, an annular continuous toothing or knurling complementary with the annular toothed crown.

7. A valve according to claim 1, wherein the control surface forms a circumferential surface with respect to the control axis and extending radially externally with respect to the stopping portions,
   said annular surface having a radial narrowing on a side facing towards the housing and a radial enlargement on a side of the narrowing opposite to the housing, so that:

when the handle moves to the raised position, the narrowing slides on the stopping portions pushing them radially inwardly to the locking position, and when the handle moves towards the lowered position, the narrowing moves away from the stopping portions and the enlargement provides space for an elastic radially outward return movement of the stopping portions to the release position.

8. A valve according to claim 1, wherein the control handle has a tubular shape with:
   a radially enlarged upper portion that serves as a gripping portion,
   an approximately cylindrical lower portion that forms the control surface,
   an internal cavity that receives the locking body and a part of the turret of the housing.

9. A valve according to claim 8, wherein
   the locking body is received in the internal cavity of the handle and interposed between the housing and the handle,
   the handle and the locking body are integral in rotation around the control axis, but the handle can translate axially with respect to the locking body.

10. A valve according to claim 9, wherein one or more radial projections of an upper section engage corresponding radial recesses of the upper portion and wherein the one or more radial recesses are extended in the axial direction to form translation guides.

11. A valve according to claim 1, wherein the locking body has a tubular shape with:
    a radially widened upper section,
    a bottom portion that forms the stopping portions,
    an internal seat that receives a portion of turret of the housing,
    wherein the locking body is fixed to the housing in a rotatable manner relative to the housing around the control axis, but without the possibility of moving with respect to the housing along the control axis.

12. A valve according to claim 1, wherein a translation stroke of the handle is delimited in the raised position by an upper abutment surface formed on the locking body and, in the lowered position, by a lower abutment surface formed on the housing.

13. A valve according to claim 1, wherein an internal seat of the locking body is open towards the outside of the housing and receives an indicator device visible from the outside and connected with the flow control mechanism.

14. A valve according to claim 1, wherein the locking body forms a plate extended through a corresponding slot of the handle and having a hole for receiving a padlock, wherein said hole is positioned externally of the handle only in said raised position.

* * * * *